Feb. 9, 1971 F. G. HILL ET AL 3,562,730

ALARM CONTROL UNIT AND TEST CIRCUIT THEREFOR

Filed April 29, 1968 5 Sheets-Sheet 1

ALARM CONTROL UNIT AND TEST CIRCUIT THEREFOR

Filed April 29, 1968 5 Sheets-Sheet 2

Feb. 9, 1971 F. G. HILL ET AL 3,562,730

ALARM CONTROL UNIT AND TEST CIRCUIT THEREFOR

Filed April 29, 1968 5 Sheets-Sheet 3

ALARM CONTROL UNIT AND TEST CIRCUIT THEREFOR

United States Patent Office 3,562,730

Patented Feb. 9, 1971

3,562,730

ALARM CONTROL UNIT AND TEST CIRCUIT THEREFOR

Frederick G. Hill, Yonkers, N.Y., Lawrence H. Kelly, Little Silver, N.J., annd Joseph Li Calsi, East Meadow, N.Y., assignors to American District Telegraph Company, Jersey City, N.J., a corporation of New Jersey Filed Apr. 29, 1968, Ser. No. 724,704
Int. Cl. G08b 13/00, 29/00
U.S. Cl. 340—214 7 Claims

ABSTRACT OF THE DISCLOSURE

A protection equipment testing unit for contemporaneously ascertaining the operability of a multiplicity of pieces of protection equipment both from within a protected premises and from a remotely located place while testing from the remote place. The protected premises and the remote place are electrically connected by a conductive line. The conductive line is selectively connected to a first and a second source of direct current at the remote place. An intrusion simulator is located within the protected premises and may be activated by an individual at the remote place. A first alarm-test indicator is located within the remote place and a second alarm-test indicator is located within the protected premises. Both the first and second indicators are coupled to the piece of protection equipment. By activating the intrusion simulator, the piece of protection equipment responds to the simulated intrusion and sends a signal to both of the indicators. This will allow the protected premises and the remotely located place to contemporaneously ascertain whether the piece of protective equipment is in order.

The instant invention relates to electrical protection systems and, more particularly, to the testing of such a system and auxiliary protection equipment connected to the system.

In direct wire central station burglar alarm systems, a number of protected premises, such as, factories, banks, stores, warehouses, and similar establishments, are each connected to a central station, remote from the protected premises, by means of an individual conductor or pair of conductors, usually conventional telephone lines leased for the purpose. Each of the protected premises is provided with one or more devices which detects the entry of an intruder into the protected premises and, in addition, may be provided with one or more auxiliary devices within the protected area for detecting the presence of an intruder within the area. When an intruder enters the protected premises or is detected within the protected area, such devices or auxiliary devices cause a signal in the connecting conductor and result in an alarm at the central station.

Some premises protected with central station alarm systems, for example, banks and stores, are open for business part of the time and closed the remainder of the time. While open, such premises are protected by the employees and, in some instances, guards at the premises and central station alarm protection, at least in a part of the alarm system, is not required. Thus, the alarm system at the premises is provided with a switch, at the premises, to disconnect the part of the alarm system not in use while the premises are open. When the premises are opened for business, usually at a pre-set prescribed time, the switch at the premises is thrown, manually, to the "off" position and, when the premises are closed after business, usually also at a prescribed time, the switch at the premises is thrown back, manually, to the "on" position. In throwing the switch to the "off" position, protection of that part of the premises disconnected from the remote central station is transferred from the central station to the employees and guards at the protected premises and, in throwing the switch back to the "on" position, protection of all of the premises is returned back to the central station. Because the load on the system with the premises switch in the "on" position differs from the load on the system with the switch in the "off" position, an appropriate signal or drop occurs at the central station, notifying the operator at the central station that the position of the switch at the premises has been changed.

Protection for the premises from the central station depends, of course, on the operating condition of the protection devices and auxiliary devices at the protected premises connected into the alarm system when the switch at the premises is thrown "on." The usual practice is for the operator at the central station to test the alarm system immediately after receiving the signal that the switch at the protected premises has been thrown to the "on" position. Although systems heretofore employed could be tested from the central station, only the operator at the central station would receive a signal indicating success or failure of the system to test. The employee at the protected premises would know, from a buzzer at the protected premises, that test had been initiated. However, unless he received a telephone call from the central station advising him that the alarm system had failed test and to remain at the premises until the cause of the failure had been located and corrected, he would not know that the protected premises were not secured. Oftentimes the employee, hearing the test buzzer, would assume that the test was successful and leave the premises before he could be contacted, by telephone, by the central station operator.

The alarm system of the instant invention, including the devices in the system for detecting entry and auxiliary devices for detecting the presence of intruders within the protected area, can be tested from the central station and both the operator, at the central station, and the employee or guard, at the protected premises, are given a signal indicating whether the system has tested properly. Thus, immediately at the end of test, both the employee at the protected premises and the central station operator know whether the premises are secured and protected and whether protection of the premises has been properly transferred back to the central station. Should the test fail, the employee or guard at the protected premises, will immediately know that the test had failed without waiting for a telephone call from the central station operator.

The alarm system of the instant invention utilizes the customary arrangement of a supervisory current flowing through the circuit and over a direct wire from the protected premises to the central station. Various detection devices, and auxiliary devices, connected to the alarm system at the protected premises, when actuated by some activity of an intruder, cause either a break or a ground in the circuit. A break in the circuit actuates a break detecting element at the central station. A ground causes the supervisory current flowing through the circuit to increase a predetermined magnitude and actuate a ground detecting element at the central station. The break detecting element and ground detecting element are connected in series in the circuit at the central station and when either element is actuated, a drop or alarm is given at the central station.

During test of the alarm system of the instant invention test current flows through the circuit from the central station to the protected premises. Through relays at the pıotected premises and a transformer at the central station a test signal is displayed at the protected premises and the central station. If the detection devices and auxiliary devices, at the time of test, are in secure, or non-alarm, condition, a signal is actuated at the protected premises and at the central station. Thus, both the operator at the central station and the employee at the protected premises know, immediately, whether the alarm system has tested satisfactorily. At the same time auxiliary protection devices are tested.

The invention will be understood by the following description of the preferred embodiment and the appended drawings, in which FIG. 1 shows the alarm system circuit with the protected premises secured and the alarm system in non-alarm condition;

Figure 1:
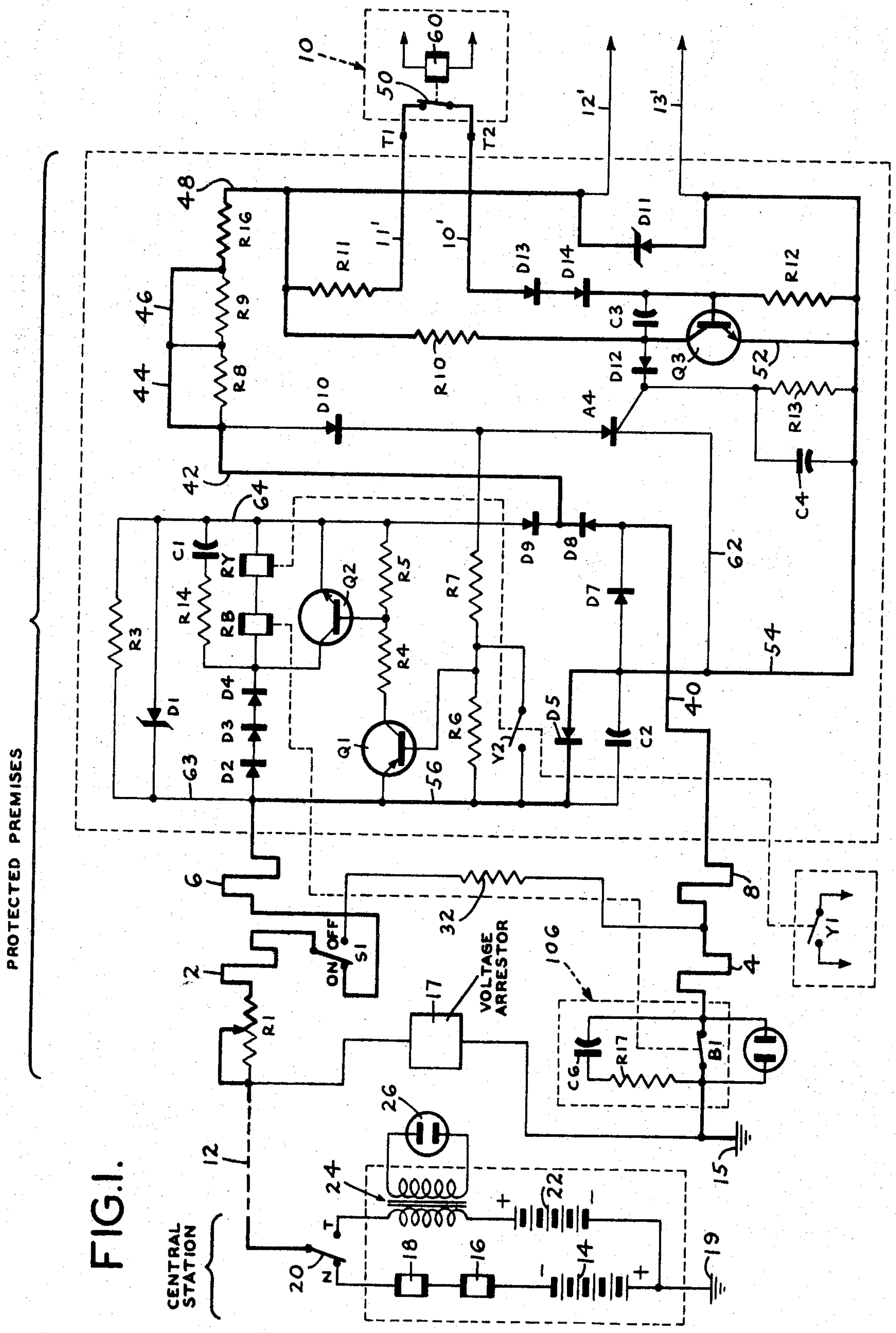

Referring to FIGS. 1 to 4, the circuit of the alarm system of the instant invention at the protected premises includes stationary detection devices 2, 4, such as foil strips, wires, contacts, and the like, for protection of the premises when the premises is open and closed, movable detection devices, 6, 8, such as foil strips, wires, contacts, and the like, for protection of the premises only when the premises is closed, and an auxiliary detection device, generally designated 10, which, when the protected premises are closed and the alarm system is in operation, protects an area within the protected premises. The circuit of the alarm system at the protected premises is connected to the central station, which may be miles away from the protected premises, by a wire 12, such as a leased telephone wire which, between the central station and protected premises, may be connected through one or more telephone exchanges. The opposite end of the alarm circuit is connected to ground at 15. Voltage arrester 17 is connected, in parallel in the alarm circuit at the protected premises, between ground connection 15 and the central station side of adjustable resistor R1.

For purpose of the instant invention, the central station equipment includes series connected batteries 14 connected at their positive side to ground 19 and at their negative side, in series, to break detecting relay 16, ground detecting relay 18 and post N of switch 20. Series connected test batteries 22 are connected at their negative side to ground 19 and at their positive side to the primary winding of transformer 24 and post T of switch 20. The secondary winding of transformer 24 is connected to neon light 26. Switch 20, at the central station, is connected to the central station end of wire 12 and, at the protected premises, the end of wire 12 is connected to variable resistor R1, in series with the alarm system at the protected premises, for adjusting of current flow in the alarm circuit.

In the instant invention, the alarm system is tested after the premises is closed and switch S1 has been thrown from the "off" to the "on" position connecting the movable and auxiliary devices into the system. Thus, in FIGS. 1 to 4, switch S1 is shown in the "on" position. When switch S1 at the protected premises is in the "off" position and switch 20 at the central station is in the N, or normal, position, current at the protected premises flows from ground 15 through closed switch B1, stationary detection device 4, resistor 32, switch S1, stationary detector device 2, resistor R1, wire 12, switch 20, break relay 18, ground relay 16 and batteries 14, to ground 19. While switch S1 is in the "off" position, i.e., while the protected premises are open for business, if an intruder breaks either of the stationary detection devices 2 or 4, the alarm circuit is broken, causing break relay 18, at the central station, to actuate and indicating an alarm at the central station. After dealing with the intruder, the broken stationary detection device, either 2 or 4, is restored and the break relay 18 is reset.

With switch S1 in the "off" position only a part of the circuit of the alarm system at the protected premises is connected to the central station. Hence, maximum current is flowing through the circuit and, at the central station, ground detecting relay 18 is actuated, or dropped.

When the protected premises is closed for business, switch S1, at the protected premises, is thrown, by an employee or guard at the protected premises, from the "off" to the "on" position. The throwing of switch S1 causes a momentary break in the alarm circuit and actuates break detecting relay 16 at the central station. Because switch S1, when in the "on" position, connects movable detection devices 6, 8 and auxiliary detection device 10 into the alarm circuit at the protected premises, when switch S1 is thrown into the "on" position, current flow in the alarm circuit is decreased and ground detecting relay 18 is released. The momentary break in the alarm circuit and resulting actuation of break detecting relay 16 causes an alarm at the central station. Knowing that it is the time for the protected premises to close, the central station operator resets break detecting relay 16 and ground detecting relay 18. If the relays will reset, the central station operator knows that the protected premises have been closed, switch S1 thrown, and the alarm system is in condition for test. If, on the other hand, the relays can not be reset, the central station operator then knows that the break in the alarm circuit was because of an intruder.

Figure 2:
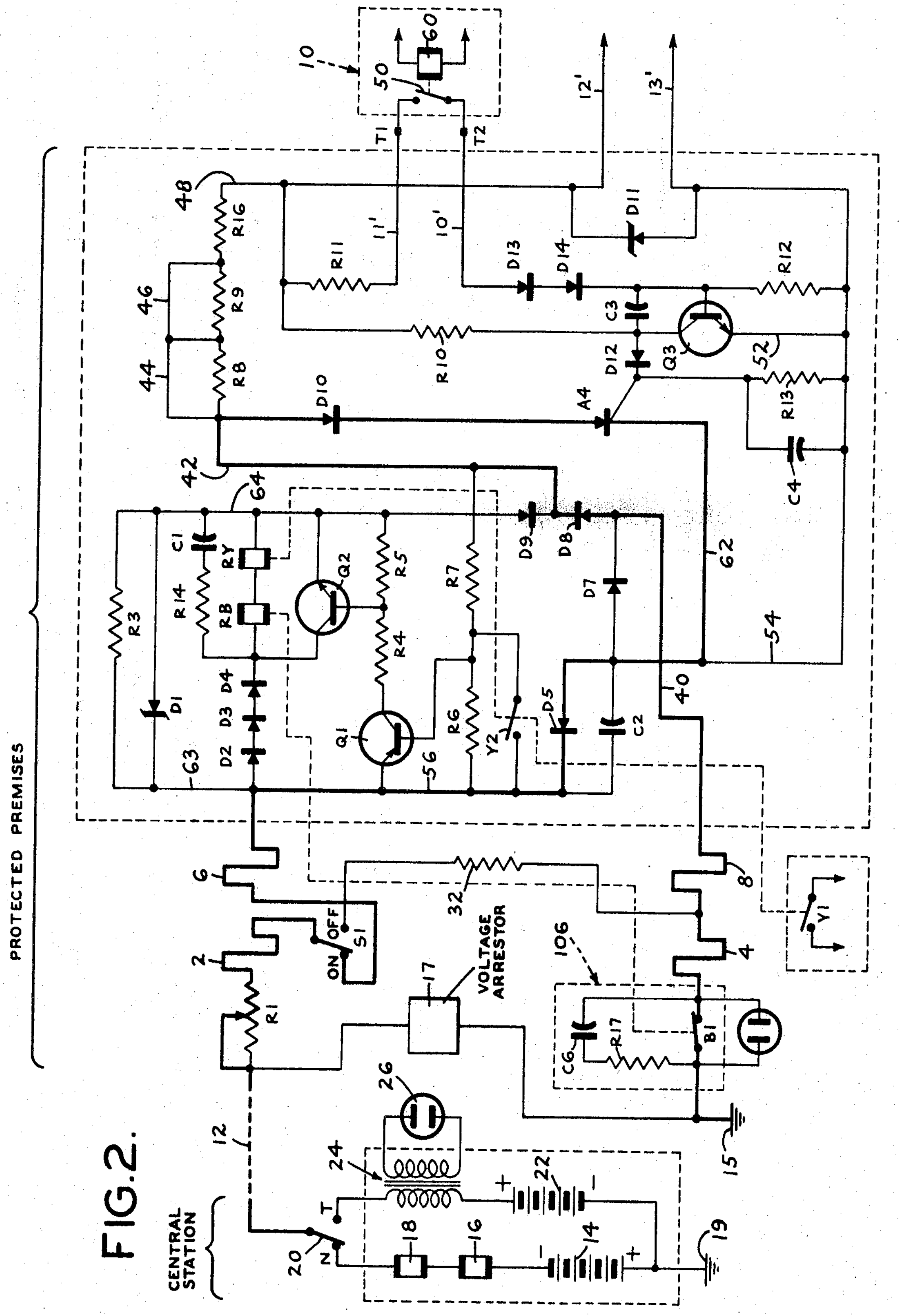
FIG. 2 is similar to FIG. 1 but shows the alarm system in alarm condition.
Figure 3:
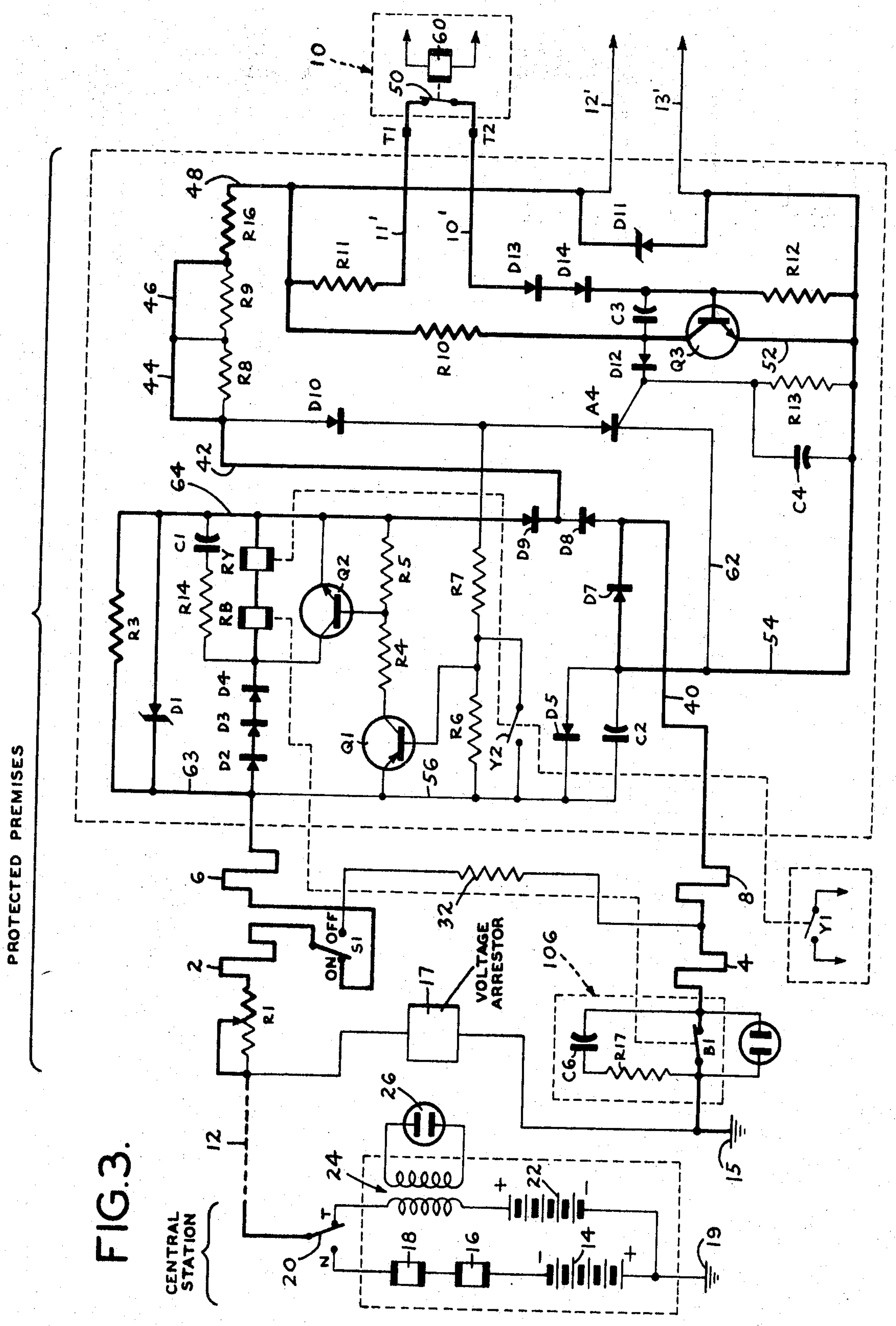
FIG. 3 shows the alarm system circuit with the protected premises secured as test is initiated and with the alarm system in non-alarm condition.

Before describing the test procedures and the circuitry of FIG. 3 showing the alarm system of the instant invention in non-alarm test and FIG. 4 in test with test alarm, FIGS. 1 and 2 showing the system in normal "on" non-alarm and alarm conditions, respectively, will be described.

Referring to FIG. 1, with switch S1 closed, the alarm circuit at the protected premises is connected through wire 12 to the central station and, at the central station, is connected through the N contact of switch 20 to series connected relays 16, 18 and the negative side of batteries 14. Current then flows, at the protected premises, from positive ground 15 through closed switch B1, stationary detection device 4, movable detection device 8 and wire 40 to the anode of diode D8. Silicon controlled rectifier A4 is open and current flows from the cathode of diode D8 through wire 42, straps 44, 46, resistor R16, wire 48, resistor R11, closed contacts 50 of auxiliary detection device 10 and diodes 13, 14 to transistor Q3 and through 6.8 volt Zener diode D11 connected around leads 12', 13' for purposes hereinafter described. The base current turns transistor Q3 on and current flows through transistor Q3 through wire 52 and resistor R12 to wire 54 and through wire 54, diode D5, wire 56, movable detection device 6, switch S1, permanent detection device 2, adjustable resistor R1, and wire 12 to the central station. At the central station current flows through the N contact of switch 20 ground detecting relay 18, break detecting relay 16, batteries 14, to ground 19. The protected premises is secured and the alarm system is in non-alarm condition and set for alarm by an intruder. If any of the stationary detection devices 2, 4 or movable detection devices 6, 8 is broken by an intruder, the circuit of the alarm system is broken and break detection relay 16 at the central station is actuated giving an alarm signal at the central station.

Turning now to FIG. 2, showing the alarm circuit of FIG. 1 in alarm condition, an intruder has remained in the premises while the protected premises were being closed or has entered the premises through an entrance unprotected by stationary or movable detection devices and the alarm system at detection devices 2, 4, 6, 8 has not been broken. On entering the area of the premises protected by auxiliary detection device 10, the intruder causes the auxiliary device to go into alarm.

Auxiliary detection device 10 shown in FIGS. 1 to 4 may be any type of detection device powered from a source other than the alarm circuit, as for example, a capacitance alarm system, and having a switch 50 actuated by the independent alarm system, for example by relay 60. Switch 50, of course, is connected into the central station alarm system with which the instant invention is concerned. When auxiliary detection device 10 is actuated and goes into alarm, switch 50 is opened by relay 60, breaking the circuit between resistor R11 and diode D13.

Referring to FIGS. 1 and 2, as switch 50 is opened by the alarm of auxiliary detection device 10, base current to transistor Q3 is interrupted, shutting off transistor Q3, causing a momentary current flow through resistor R10 and diode D12, triggering and firing silicon controlled rectifier A4, locking rectifier A4 closed and closing the current path through diode D10, rectifier A4 and wire 62, diode D5, wire 56 movable detection device 6, switch S1, permanent detection device 2, resistor R1 and wire 12 to the central control station. Once triggered and fired, silicon controlled rectifier A4 remains locked in the circuit.

The opening of switch 50 by relay 60 of the auxiliary detection device and the firing and locking in of silicon controlled rectifier A4, lowers the resistance in the alarm control circuit and increases the current flowing through ground detection relay 18 causing relay 18 to drop and actuate an alarm at the central station. Silicon controlled rectifier A4 remains locked in the circuit until current in the alarm circuit is shut off and switch 50 is closed.

Figure 4:
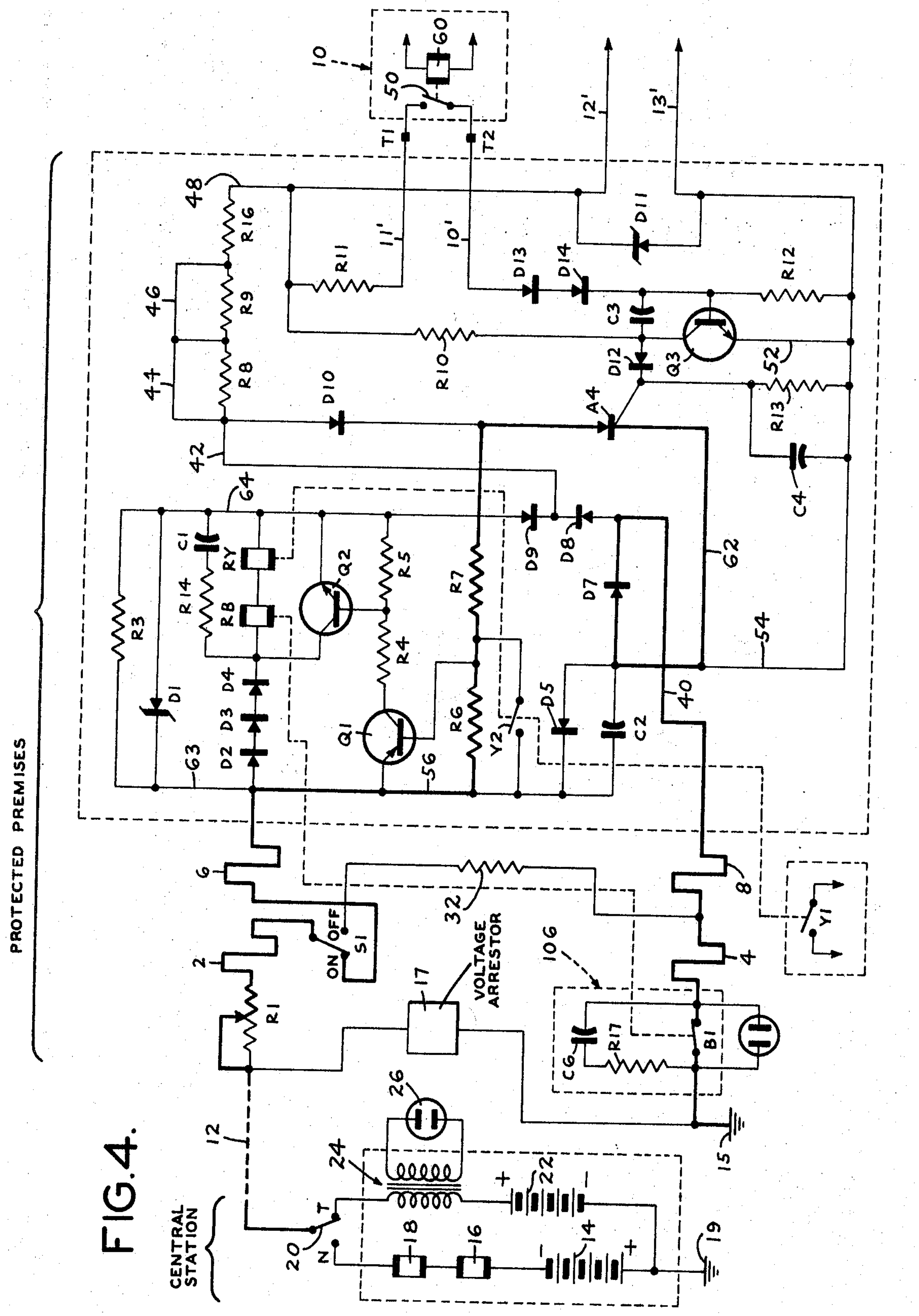
FIG. 4 is similar to FIG. 3 but shows the alarm system circuit as test is initiated and with the alarm system in the alarm condition.

Referring next to FIGS. 3 and 4 showing the alarm system of the instant invention in test non-alarm and test alarm conditions, respectively, for test after the operator has received the signal at the close of business at the protected premises that switch S1 has been thrown from the "off" to the "on" position, the central station operator to test the alarm system throws switch 20 at the central station from the "N" normal to the "T" test position.

In the circuitry of FIGS. 3 and 4, the circuit is tested at 130 volts with the polarity of the alarm circuit reversed, that is, the test batteries at the central station are connected in series with the positive battery terminal connected to wire 12 through the primary winding of transformer 24 and terminal T of switch 20. The negative terminal of the test batteries are connected to ground. Thus, during test, current flows from the central station to ground at the protected premises, the reverse of the current flow in the alarm circuit during normal operation.

With switch 20 at the central station in the T position, current flows through wire 12, resistor R1, permanent detection device 2, switch S1 in the "on" position and movable detection device 6. Because transistor Q1 is turned off and the resistance of resistors R6, R7, current flows from detection device 6 through wire 63, Zener diode D1 and resistor R3 and, at the same time, flows through diodes D2, D3 and D4 and relays RB and RY to wire 64. From wire 64 the current flows through diode D9, wire 42, straps 44, 46, resistor R16, wire 48, resistor R11, closed switch 50 of auxiliary detection device 10, diodes D13, D14, "on" transistor Q3, wires 52, 54 and diode D7. From diode D7 the current flows through wire 40, movable detection device 8, permanent detection device 4, closed switch B1 to ground 15.

Relay RB is connected, mechanically, to switch B1 and relay RY is connected, mechanically, to switches Y1, Y2. After switch 20 at the central station is thrown from N position to T position, by the central station operator initiating test, the test current in the alarm circuit increases and, when the current reaches a predetermined value, for example 10+milliamps, relay RY is actuated, closing switches Y1, Y2.

Considering, first, the closing of switch Y1 by the activation of relay RY, switch Y1 is in the circuit of an alarm test simulator, powered from a separate power source, and the test simulator is in the area protected by auxiliary detection device 10. The alarm test simulator simulates conditions in the area protected to which the auxiliary detection device 10 is sensitive when an intruder is in such area. For example, if the auxiliary detection device 10 is an ultrasonic alarm system, the alarm test simulator, in the protected area, may be a fan which, when switch Y1 is closed, is operated and, when switch Y1 is opened, stops.

When switch Y1 is closed by relay RY, simulating alarm conditions in the area protected, auxiliary detection device, powered from an independent source, goes into alarm and switch 50 is opened by relay 60 in the auxiliary detection device. Thus, the circuit between resistor R11 and diode D13 is broken, base current to transistor Q3 is interrupted, shutting off transistor Q3 and silicon controlled rectifier A4 is triggered, fired and locked in. The current in the circuit then increases and when the current reaches 19 to 21 milliamps relay RB is energized and opens switch B1. The neon light in test unit 106 at the protected premises flashes and, because of the pulsing action of the RB relay in the system neon light 26 at the central station flashes and both neon lights continue to flash until switch 20 at the central station is thrown, by the central station operator, from "T," test, back to "N," normal. Thus, both the operator at the central station and the employee at the protected premises know that the alarm system has tested satisfactorily and that the protected premises are secured.

Referring now to FIG. 4, prior to initiation of test by the central station operator throwing switch 20, at the central station, from "N," normal, to "T," test, the auxiliary detection device 10 has gone into alarm, switch 50, because of the alarm, has been opened, and silicon controlled rectifier A4 has been triggered, fired and locked in before test is initiated. At the instant that the test batteries are applied by the central station operator, by throwing switch 20 to "T," test, position, current flows from batteries 22, through transformer 24, line 12, resistor R1, permanent protection device 2, switch S1, movable protection device 6, wire 56, resistors R6, R7, silicon controlled rectifier A4, diode D7, wire 40, movable protective device 8, permanent protective device 4 and switch B1 to ground.

Resistor R14 and condenser C1 delay the actuation of relays RB and RY and transistor Q1 receives base current and turns on and current flows through transistor Q1, resistors R4, R5, diode D9 wire 42 and diode D10 to silicon controlled rectifier A4. Transistor Q2 receives base current and turns on and current flows through transistor Q2 to diode D9. When transistor Q2 is turned on, relays RB and RY are bypassed and will not energize. Thus, switch B1 is not opened and the neon tube in test unit 106, at the protected premises, and neon tube 26 at the central station do not flash on and off. The employee at the premises and the central station operator then know that the alarm system has not satisfactorily tested.

Auxiliary detection device 10, FIGS. 1 to 4, is powered from a separate source and, when in alarm, relay 60 opens switch 50 in the alarm circuit. Switch 50 is connected across leads 10', 11', and leads 12', 13' are not used. Rather than the auxiliary detection device 10, such as an ultrasonic alarm system, separately powered, the auxiliary detection device may be connected into the alarm system of the instant invention and take its power therefrom. For example, in FIG. 5 the connection of an auxiliary detection device powered from the alarm circuit is shown. Such an auxiliary device may be, for example, a capacitance alarm which, when an intruder is in the immediate vicinity of the protected object, goes into alarm.

Figure 5:
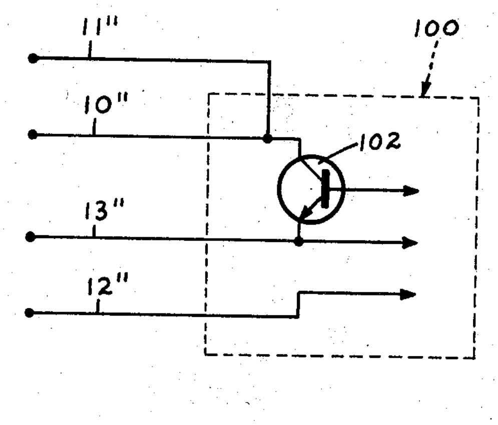
FIG. 5 is a schematic wiring diagram of the signal portion of an auxiliary detection device for use with the alarm system of FIGS. 1 to 4.

Referring now to FIG. 5, leads 10″, 11″, 12″ and 13″ of auxiliary detection device, generally designated 100, are connected, respectively, to leads 10′, 11′, 12′ and 13′ of the alarm system of FIGS. 1 to 4. Leads 10″ and 11″ are joined and connected to transistor 102 which, in the normal non-alarm condition of the circuitry, not shown, of auxiliary detection device 100, is turned off. Leads 12″ and 13″ supply power to the circuitry of auxiliary detection device 100 and lead 13″ is connected to transistor 102. With device 100 in non-alarm, the voltage between connected leads 10″, 11″ and lead 13″ is high. When the circuitry of auxiliary device 100 is in alarm, by the presence of an intruder or in alarm test, transistor 102 is turned on, dropping the voltage between interconnected lead 10″, 11″ and lead 13″. When in alarm, with transistor 102 turned on, because of an intruder in the area, this drop in voltage interrupts base current to transistor Q3, FIGS. 1 to 4, shuts off transistor Q3 and triggers, fires and locks in silicon controlled rectifier A4, heretofore described.

For purposes of testing, the auxiliary detection device 100 of FIG. 5, alarm conditions to which the auxiliary device is sensitive must be simulated. Thus, for example, if the auxiliary detection device 100 is sensitive, for alarm purposes, to a change in electrical capacitance caused by human proximity, switch Y1 is connected to a circuit which, when energized during test by the closing of switch Y1 by relay RY, simulates such a change on auxiliary device 100.

Figure 6:
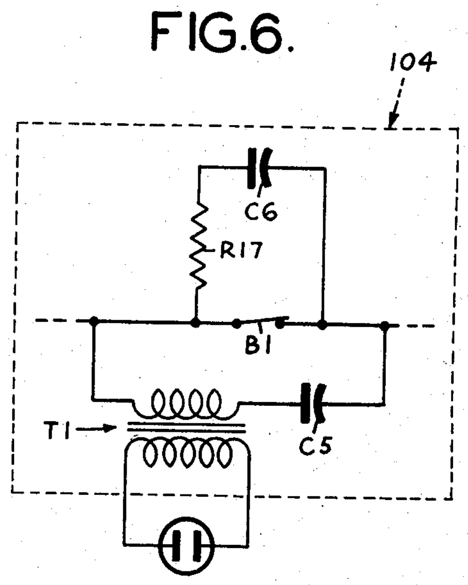
FIG. 6 is a schematic wiring diagram of a modified test signal unit for use in the alarm system of FIGS. 1 to 5.

In the embodiment of the invention illustrated in the circuit diagrams of FIGS. 1 to 4, the alarm circuit is energized at 52 volts, negative polarity, from the central station and tested at 130 volts, positive polarity. The polarity of the system, if desired, can be reversed by interchanging the connections at the right hand ends of movable detection devices 6, 8, as viewed in FIGS. 1 to 4. The alarm system of the instant invention may be energized and tested at 52 volts, with polarity in one direction during normal operation and reverse direction during test. However, where it is desired to test at 52 volts, test indicator 104, FIG. 6, must be substituted for test indicator 106, FIGS. 1 to 4, and the lead wire to resistor R3 must be cut or resistor R3 removed.

The alarm system of the instant invention may be adapted for use with 78 volt central station supply or 130 volt central station supply, depending upon central station voltage available in the area. For use with 78 volts wire 46 is cut thereby adding resistor R9 to resistor R16, FIGS. 1 to 4. For use with 130 volts wires 44, 46 are both cut thereby adding resistors R8 and R9 to resistor R16.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A protection equipment testing unit for contemporaneously ascertaining the operability of a multiplicity of pieces of protection equipment each one of which is designed to sense an occurrence both from within a protected premises and from a remotely located place while testing from the remote place comprising, a conductive line electrically conecting the protected premises to the remotely located place, a first and a second source of direct current situated at the remotely located place, means for selectively coupling the opposite polarities of said first and said second sources to said conductive line, a first alarm-test indicator located at the remote place coupled in series with said second source, a second alarm-test indicator located at the protected premises coupled in parallel with said conductive line, a first relay switch coupled in series with said conductive line, said relay switch capable of being activated by a buildup in the current within said conductive line, a first triggering device, said first triggering device being connected to said relay switch, an intrusion simiulator connected to said first triggering device which yields an occurrence substantially the same as the occurrence which the particular piece of protective equipment is designed to sense, a break relay coupled to the particular piece of protection equipment, a second relay switch, said second relay switch being coupled in series with the conductive line and coupled to said break relay, capable of being activated by a further build-up in the current within said conductive line, a second trigger connected to said second relay switch and in parallel with both said first and said second alarm-test indicators, said second relay being normally in a closed condition, which upon the attainment of a further current reverses condition to cause the current in said conductive line to flow through both of said alarm-test indicators and allow contemporaneous verification from both the remote place and the protected premises of the operability of the particular piece of protection equipment and the integrity of the connecting circuit.

2. A protection equipment testing unit according to claim 1 further comprising a locking means electrically connected to said second alarm-test indicator, for locking said alarm-test indicator in an increased current flow condition upon the opening of said second relay switch in response to a disturbance in the area of said sensing device.

3. A protection equipment testing circuit according to claim 2 in which said locking means is a silicon controlled rectifier.

4. A protection equipment testing circuit according to claim 2 further comprising a by-pass means electrically coupled to said first alarm-test indicator for bypassing current when said first alarm-test indicator is locked in its changed current condition.

5. A protection equipment testing circuit according to claim 4 further comprising an electronic switch connected to said first triggering device and responsive to the signals emitted by said first triggering device in response to said intrusion simulator.

6. A protection equipment testing circuit according to claim 5 in which said electronic switch is a transistor.

7. A signalling system according to claim 6 in which said alarm-test indicators are neon tubes.

References Cited

UNITED STATES PATENTS

| | | | |
|---|---|---|---|
| 3,010,100 | 11/1961 | Muehter | 340—276 |
| 3,009,137 | 11/1961 | Cassell | 340—214 |

DONALD J. YUSKO, Primary Examiner

J. M. BOBBITT, Assistant Examiner

U.S. Cl. X.R.

340—274, 276

UNITED STATES PATENT OFFICE

CERTIFICATE OF CORRECTION

Patent No. 3,562,730 Dated 2/9/71

Inventor(s) Hill et al.

It is certified that error appears in the above-identified patent and that said Letters Patent are hereby corrected as shown below:

Col. 2, line 48, "had" should be -- has --;

4, line 63, insert comma after "20";

5, line 24, insert comma after "56";

line 66, "on" should be -- closed --;

6, line 16, "auxiilary" should be -- auxiliary --;

line 45, "protection" should be -- detection --;

line 46, "protection"should be -- detection --;

line 53, insert comma after "D9";

7, line 68, "conecting" should be -- connecting --;

8, line 24, "relay" should be - trigger --.

Signed and sealed this 21st day of September 1971.

(SEAL)
Attest:

EDWARD M.FLETCHER,JR.
Attesting Officer

ROBERT GOTTSCHALK
Acting Commissioner of Pat